United States Patent
Keller et al.

(10) Patent No.: US 10,025,386 B2
(45) Date of Patent: Jul. 17, 2018

(54) PROVIDING TACTILE FEEDBACK TO A USER THROUGH ACTUATORS MOVING A PORTION OF THE USER'S SKIN

(71) Applicant: Oculus VR, LLC, Menlo Park, CA (US)

(72) Inventors: Sean Jason Keller, Kirkland, WA (US); Tristan Thomas Trutna, Seattle, WA (US); Garett Andrew Ochs, Seattle, WA (US); Selso Luanava, Woodinville, WA (US); Nicholas Roy Corson, Mukilteo, WA (US)

(73) Assignee: Oculus VR, LLC, Menlo Park, CA (US)

( * ) Notice: Subject to any disclaimer, the term of this patent is extended or adjusted under 35 U.S.C. 154(b) by 14 days.

(21) Appl. No.: 15/344,425

(22) Filed: Nov. 4, 2016

(65) Prior Publication Data

US 2017/0131773 A1    May 11, 2017

Related U.S. Application Data

(60) Provisional application No. 62/253,079, filed on Nov. 9, 2015.

(51) Int. Cl.
*G06G 5/00* (2006.01)
*G06F 3/01* (2006.01)

(52) U.S. Cl.
CPC .............. *G06F 3/016* (2013.01); *G06F 3/011* (2013.01); *G06F 3/014* (2013.01); *G06F 3/017* (2013.01)

(58) Field of Classification Search
CPC .......... G06F 3/016; G06F 3/017; G06F 3/011; G06F 3/014
See application file for complete search history.

(56) References Cited

U.S. PATENT DOCUMENTS

| | | | | |
|---|---|---|---|---|
| 6,088,017 A * | 7/2000 | Tremblay | ................ | G06F 3/011 345/156 |
| 6,304,840 B1 * | 10/2001 | Vance | ..................... | G06F 3/014 703/21 |
| 7,042,438 B2 * | 5/2006 | McRae | ................... | A63F 13/06 345/156 |
| 7,472,047 B2 * | 12/2008 | Kramer | .................. | G06T 19/20 703/6 |
| 8,519,999 B2 * | 8/2013 | Visser | ..................... | G06T 15/08 345/419 |

(Continued)

Primary Examiner — Vijay Shankar
(74) Attorney, Agent, or Firm — Fenwick & West LLP (57) ABSTRACT

An input interface for a virtual reality (VR) system includes one or more actuators stressing or straining a portion of a user's skin, simulating interactions with presented virtual objects. For example, an actuator comprises a tendon contacting portions of a user's body and coupled to a motor that moves the tendon to move portions of the user's body contacting the tendon. Alternatively, an actuator includes a pad having a surface contacting a surface of the user's body. A driving mechanism moves the pad in one or more directions parallel to the surface of the user's body with varying levels of normal force. In another example, one or more pins contact portions of the user's body and a surface of a bladder. The pins move as the bladder is inflated or deflated, which moves the contacted portions of the user's body. Alternatively, another type of actuator may move the pins.

10 Claims, 4 Drawing Sheets

(56) References Cited

U.S. PATENT DOCUMENTS

| | | | |
|---|---|---|---|
| 8,593,402 B2* | 11/2013 | Stinson, III | G06F 3/0304 345/157 |
| 2008/0094351 A1* | 4/2008 | Nogami | G06F 3/016 345/156 |

* cited by examiner

PROVIDING TACTILE FEEDBACK TO A USER THROUGH ACTUATORS MOVING A PORTION OF THE USER'S SKIN

CROSS-REFERENCE TO RELATED APPLICATIONS

This application claims the benefit of U.S. Provisional Application No. 62/253,079, filed Nov. 9, 2015, which is incorporated by reference in its entirety.

BACKGROUND

The present disclosure generally relates to controls for virtual reality systems, and specifically relates to a control providing tactile feedback to a user interacting with a virtual reality system.

Virtual reality (VR) systems typically provide multiple types of sensory output to a user, such as audio and video data presented by a VR headset and audio system, respectively. By providing different types of sensory output, a VR system provides the user with an illusion that the user is immersed in a virtual world generated by the VR system. Additionally, a VR system may include an input interface, such as a glove, that detects position, acceleration, orientation, and other information associated with a portion of the user's body (e.g., the user's hand) and provides the information as input to the VR system. Based on the input from the input interface based on movement of the user in the real world, the VR system may move a corresponding item in the virtual world (e.g., a hand or other appendage belonging to a character in the virtual world). An input interface also facilitates user interaction with other objects in the virtual world. For example, the VR system allows the user to manipulate virtual objects by touching them, picking them up, and moving them through movement of the input interface.

SUMMARY

An input interface for a virtual reality (VR) system includes one or more actuators stressing or straining to a portion of a user's skin, simulating interactions with virtual objects presented by the VR system. For example, an actuator comprises a tendon contacting portions of a user's body and coupled to a motor that moves the tendon to move portions of the user's body contacting the tendon. As the tendon moves, portions of the user's body contacting the tendon are stretched, providing tactile feedback to the user. Alternatively, an actuator includes a pad having a surface contacting a surface of the user's body. A driving mechanism moves the pad in one or more directions parallel to the surface of the user's body. Instructions received by the driving mechanism from a component in the VR system may identify a direction in which the driving mechanism moves the pad, allowing the actuator to provide different types of tactile feedback to the user based on different instructions. For example, based on the instructions from the component in the VR system, the driving mechanism varies a level of force normal to the surface of the user's body with which the pad is moved. As another example, based on instructions from the component in the VR system, the driving mechanism alters movement of the pad to vary an amount by which a portion of the user's skin contacting the pad is twisted, varying the tactile feedback to the user provided by movement of the pad. The driving mechanism may twist the portion of the user's skin contacting the pad by moving the pad parallel to the user's skin as well as perpendicular to the user's skin (which applies a normal force to the user's skin). In another example, one or more pins contact portions of the user's body and contact a surface of a bladder. As the bladder is inflated or deflated, the pins move, causing movement, such as stretching, of the portions of the user's body contacted by the pins. Additionally, a pin may be positioned proximate to any other type of actuator that is configured to move the pin to move portions of the user's body contacting the pin. For example, a pin is coupled to a piezoelectric motor or a voice coil linear motor that repositions the pin in response to one or more instructions from a component of the VR system.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
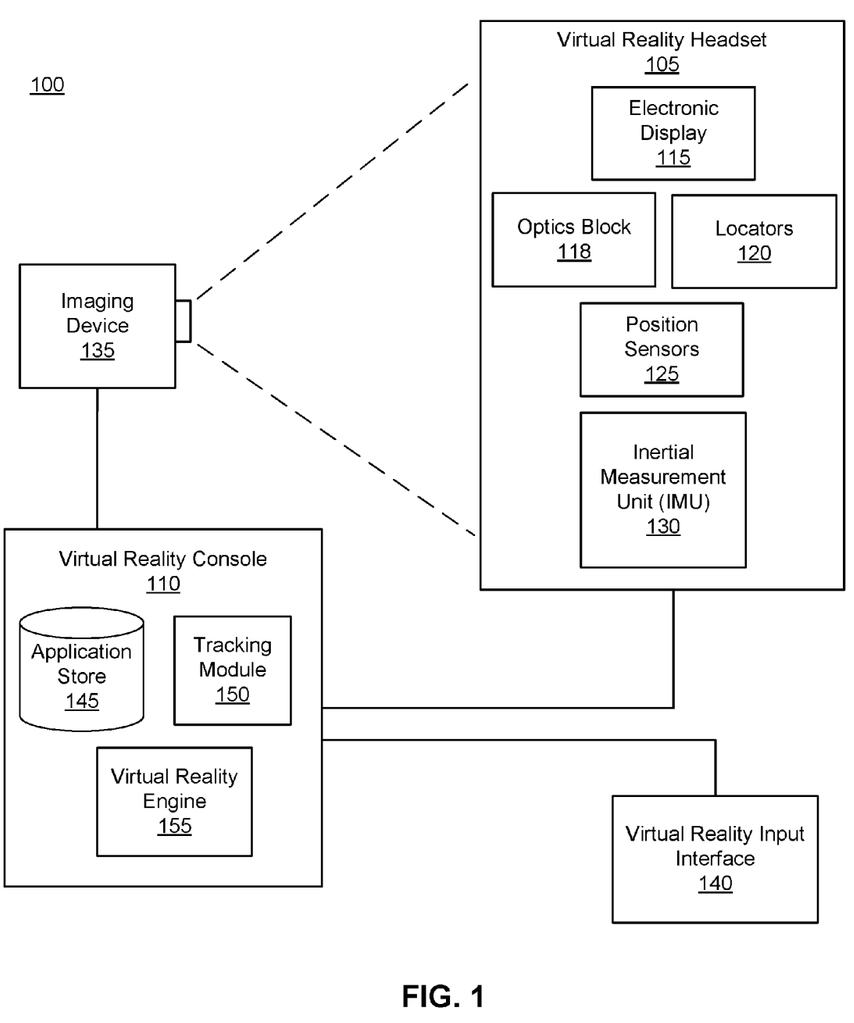
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, a corrective element 116, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The electronic display 115 includes a display area comprising a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels. In embodiments where the sub-pixels are arrayed hexagonally, the corrective element 116 may be configured to generate amounts of blur that causes the array of sub-pixels in the image presented to the user to appear to be arrayed in a rectangular layout.

The optics block 118 magnifies received light, corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. Additionally, the optics block 118 may be designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when is receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action. In various embodiments, the VR input interface 140 includes one or more controls, which are further described below in conjunction with FIGS. 2-6, contacting areas of a user's body and receiving action requests based on movement of one or more areas of the user's body. For example, the VR input interface 140 includes a glove that identifies action requests based on movements of the user's hand and communicates the action request to the VR console 110. A control included in the VR input interface 140 may also provide haptic or other tactile feedback when the VR console 110 performs an action or receives an action request. For example, a control includes one or more actuators that apply pressure, tension, or vibration to an area of the user's body contacting a portion of the control including the actuator. Hence, haptic or tactile feedback produced by the VR input interface 140 allows a user to simulate physical interaction with content presented by the VR headset 105.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
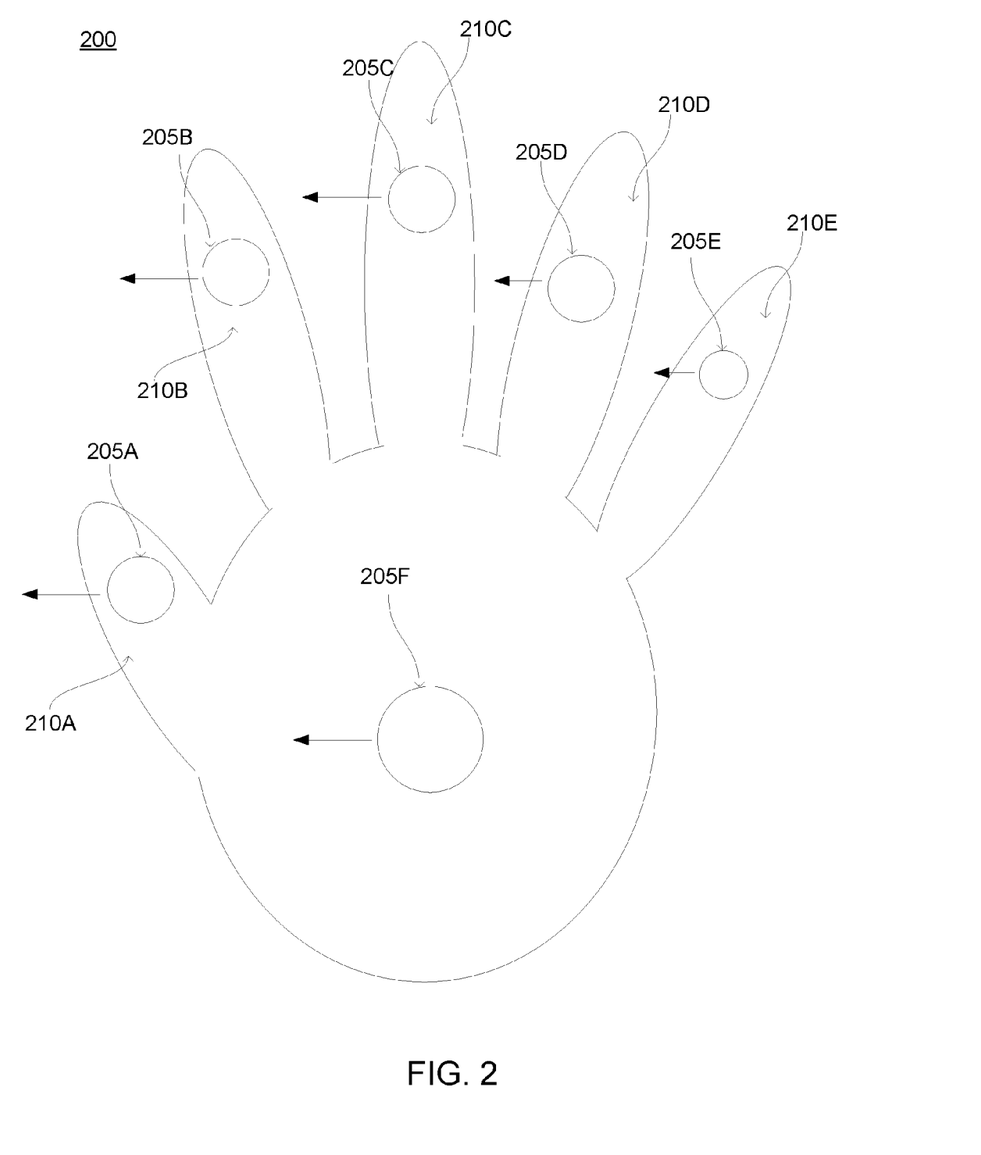
FIG. 2 is a diagram of a glove for use in a virtual reality system environment, in accordance with an embodiment.

FIG. 2 is a diagram of a control included in a VR input interface 140 of a VR system 100. For purposes of illustration, FIG. 2 shows a glove 200 as an example control included in the VR input interface 140. However, in other embodiments, the control may be any suitable article contacting a portion of a user's body. In various embodiments, the glove 200 (or other control) comprises a material (e.g., fabric) or combination of materials having a pattern or shape.

The glove 200 shown in FIG. 2 includes multiple actuators 205A-F (also referred to individually and collectively using reference number 205) in different locations of the glove 200 and contacting a user who wears the glove 200. In the example of FIG. 2, the glove 200 includes an actuator 205A-E on a portion of each finger 210A, 210B, 210C, 210D, 210E of the glove, as well as an actuator 205F in a central portion of the glove 200, such as a portion of the glove contacting a center of the user's hand when the glove is worn by the user. As further described below in conjunction with FIGS. 3-6, to provide a user with tactile feedback, when an actuator 205 is activated, the actuator 205 stretches a portion of the skin of the user that contacts the actuator 205. This stretching of the user's skin provides the user with a perception of weight, allowing more realistic interactions with a virtual environment presented to the user by the VR system environment 100. For example, activating an actuator 205 allows the glove to provide the user with a perception of weight when picking up an object presented by the VR headset 105, making content presented by the VR headset 105 more immersive. The VR console 110 may communicate instructions to the glove 200 to actuate one or more of the actuators 205 based on user actions received from the glove 200 or from other components of the VR system environment 100, so one or more actuators 205 provide tactile feedback to the user based on the user's interactions with a virtual environment presented by the VR headset 105.

In various embodiments, an actuator 205 contacts a portion of a user's skin, and when the actuator 205 is actuated, the actuator 205 moves in a direction parallel to the user's skin. Movement of the actuator 205 parallel to the user's skin stretches the portion of the user's skin, providing the user with tactile feedback, such as the perception of weight. In other embodiments, when the actuator 205 is actuated, the actuator 205 moves in a direction perpendicular to the user's skin, applying a force normal to the user's skin. Further, the actuator 205 may move parallel do and perpendicular to the user's skin when actuated in various embodiments. While FIG. 2 shows an example where the actuators 205A-F move in a common direction parallel to the user's skin, in other embodiments, actuators 205 contacting different portions of the user's skin may move in different directions (both parallel to and perpendicular to the user's skin). For example, actuators 205A-E on portions of the user's fingers 210A-E move right to left when actuated, while actuator 205F contacting the center of the user's hand moves left to right when actuated. Instructions received by an actuator 205 may identify a direction in which the actuator 205 moves in various embodiments, allowing the instructions provided to various actuators 205 to specify how different portions of the user's skin is stretched.

Figure 3:
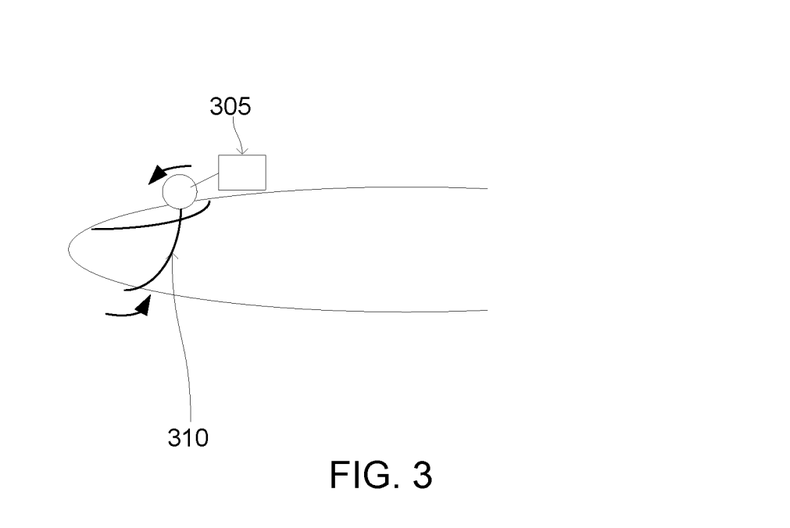
FIG. 3 is a conceptual diagram of an actuator for providing tactile feedback to a user via an input interface in a virtual reality system environment, in accordance with an embodiment.

FIG. 3 is a conceptual diagram of one embodiment of an actuator for providing tactile feedback to a user. The embodiment shown in FIG. 3 may be an implementation of one or more of the actuators 205 described above in conjunction with FIG. 2. In the embodiment of FIG. 3, the actuator includes a motor 305 and a tendon 310. However, in other embodiments, the actuator may include different or additional components than those described in conjunction with FIG. 3.

The motor 305 is coupled to the tendon 310, which is a flexible material (e.g., a braided polymer), that is oriented to enclose a portion of a user's body. For example, the tendon 310 is configured as a loop into which a finger of the user is inserted so the tendon 310 contacts one or more points of the finger. In some embodiments, the tendon 310 comprises a low-stretch or inextensible material, while in other embodiments, the tendon 310 comprises a stretchable material. When the motor 305 is activated, the motor 305 turns the tendon 310, which stretches skin of a portion of the user's body physically contacting the tendon 310. In various embodiments, the motor 305 has low inertia to reduce latency when activating the motor 305. Additionally, the motor 305 may be configured to provide smooth power delivery in some embodiments. Stretching of the portion of the user's skin from turning the tendon 310 causes the user to perceive weight, allowing simulation of the user picking up an object in a virtual environment presented by the VR headset 105. In various embodiments, the motor 305 is activated in response to the user performing certain types of interactions with content presented by the VR headset 105 via the VR input interface 140 that are identified to the VR console 110, which communicates an instruction to the motor 305 included in the VR input interface 140. In response to receiving the instruction, the motor 305 activates and turns the tendon 310, causing the user to perceive weight. For example, a finger of the user is inserted into a loop formed by the tendon 305, which contacts multiple portions of the user's finger. When the motor 305 is activated in this example, the tendon 310 turns, which stretches portions of the user's finger contacting the tendon 305, causing the user to perceive weight contacting the stretched portions of the user's finger.

Figure 4:
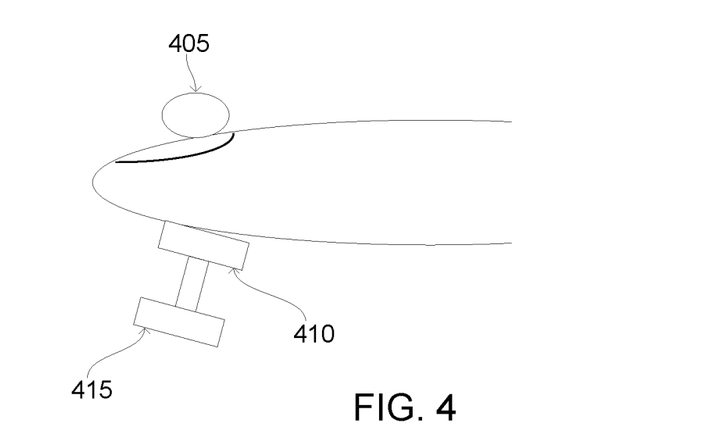
FIG. 4 is a conceptual diagram of a pneumatic actuator for applying tactile feedback to a user via an input interface in a virtual reality system environment, in accordance with an embodiment.

FIG. 4 is a conceptual diagram of one embodiment of an actuator for providing tactile feedback to a user. The embodiment shown in FIG. 4 may be an implementation of one or more of the actuators 205 described above in conjunction with FIG. 2. In the embodiment of FIG. 4, the actuator includes a bladder 405, a pad 410, and a driving mechanism 415. However, in other embodiments, the actuator may include different or additional components than those described in conjunction with FIG. 4.

In various embodiments, the actuator includes the bladder 405, which is configured to contact a portion of a user's body, and a pad 410 positioned in a plane parallel to a plane including the bladder 405 and separated from the bladder 405 by a distance. A portion of a user's body is positioned in the distance between the bladder 405 and the pad 410 so the bladder 405 contacts a portion of a surface of the user's body and the pad 410 contacts a portion of another surface of the user's body that is in a plane parallel to a plane including the surface of the user's body. For example, a user's finger is positioned in the distance between the bladder 405 and the pad 410 so the bladder 405 contacts a portion of a top surface of the user's finger and the pad 410 contacts a portion of a bottom surface of the user's finger. The bladder 405 may be filled with a fluid, such as air, to inflate the bladder 405, increasing contact between a portion of the surface of the user's body and the pad 410. In some embodiments, the actuator does not include the bladder 405, and any suitable device or technique is used to create contact between the portion of the surface of the user's body and a surface of the pad 410.

The pad 410 has a high friction surface configured to contact the portion of the surface of the user's body. Having a high friction surface contact the portion of the surface of the user's body allows a surface of the pad 410 to remain in contact with the portion of the user's body while the pad 410 moves. In some embodiments, a surface of the pad 410 is affixed to the portion of the user's body through suction or another method allowing the surface of the pad 410 to contact the portion of the user's body that also allows the user to remove the surface from the pad 410 from contacting the user's body.

In various embodiments, the driving mechanism 415 is a pneumatic or hydraulic device that moves the pad 410 in one or more directions parallel to the surface of the user's body in response to inputs. The driving mechanism 415 may also provide a force normal to the surface of the user's body based on instructions from the VR console 110 by moving the pad perpendicular to the surface of the user's body, allowing the instructions to vary an amount of force normal to the surface of the user's body applied by the driving mechanism 415 when moving the pad 410. For example, the driving mechanism 415 receives one or more instructions from the VR console 110, or other component of the VR system environment 100, and moves the pad 410 in a direction, such as a direction parallel to the surface of the user's body and/or a direction perpendicular to the surface of the user's body, specified by the one or more instructions. As the driving mechanism 415 moves the pad 410, the portion of the surface of the user's body contacting the high friction surface of the pad 410 (or to which a surface of the pad 410 is affixed via suction) moves along with the pad 410. In various embodiments, the surface of the pad 410 contacts a portion of the user's skin, so movement of the pad 410 by the driving mechanism 415 moves the portion of the user's skin contacting the surface of the pad 410, causing the user's skin to stretch and perceive weight or other tactile feedback.

Figure 5A:
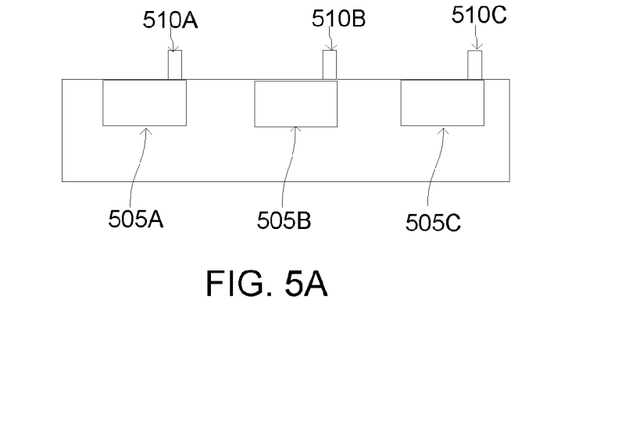
FIGS. 5A and 5B are conceptual diagrams of an actuator providing tactile feedback to a user by inflating one or more bladders, in accordance with an embodiment.
Figure 5B:
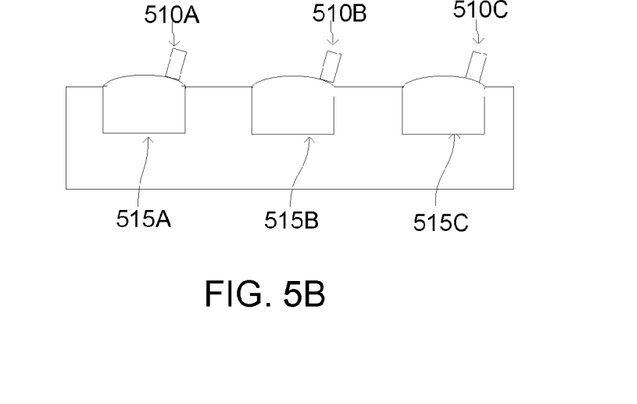

FIGS. 5A and 5B are conceptual diagrams of one embodiment of an actuator providing tactile feedback to a user by inflating one or more bladders. The embodiment shown in FIGS. 5A and 5B may be an implementation of one or more of the actuators 205 described above in conjunction with FIG. 2. However, in other embodiments, the actuator may include different or additional components than those described in conjunction with FIGS. 5A and 5B.

In the example of FIG. 5A, the actuator includes multiple bladders 505A, 505B, 505C and pins 510A, 510B, 510C positioned on a surface of the actuator. Each pin 510A, 510B, 510C comprises a rigid material and is positioned proximate to a surface of a bladder 505A, 505B, 505B and offset from a center of the bladder 505A, 505B, 505C. For example, a pin 510A is positioned within a threshold distance of a rear boundary of a bladder 505A and proximate to, or contacting, a surface of the bladder 505A. Each pin 510A, 510B, 510C has a surface contacting a surface of a bladder 505A, 505B, 505C or contacting a surface of the actuator proximate to a surface of a bladder 505A, 505B, 505C. Additionally, an additional surface of various pins 510A, 510B, 510C is configured to contact a portion of a surface of the user's body, such as a portion of the user's skin.

As shown in FIG. 5B, when a bladder 505A is inflated with a fluid, such as air, the pin 510A positioned proximate to the surface of the bladder 505A moves. For example, in FIG. 5B, the inflated bladder 515A causes a change in position of the pin 510A proximate to the surface of the inflated bladder 515A relative to a position of the pin 510A when the bladder 505A is uninflated. In the example shown by FIG. 5A, when the bladders 505A, 505B, 505C are uninflated, the pins 510A, 510B, 510C are perpendicular to surfaces of the bladders 505A, 505B, 505C. As shown in FIG. 5B, the pins 505A, 505B, 505C are not perpendicular to the surfaces of the inflated bladders 515A, 515C, 515C. When the positions of the pins 510A, 510B, 510C change from inflation of the bladders 505A, 505B, 505C, portions of the surface of the user's body contacting the additional surface of the pins 510A, 510B, 510C are moved, providing tactile feedback to the user. For example, when the bladders 505A, 505B, 505C are inflated to become inflated bladders 515A, 515B, 515C, movement of the pins 510A, 510B, 510C from the inflation stretch portions of the user's skin contacting the additional surfaces of the pins 510A, 510B, 510C, providing tactile feedback to the user. In various embodiments, the actuator receives instructions from the VR console 110 or another component of the VR system environment 100 and inflates one or more of the bladders 505A, 505B, 505C based on the instructions to provide tactile feedback to the user.

Figure 6:
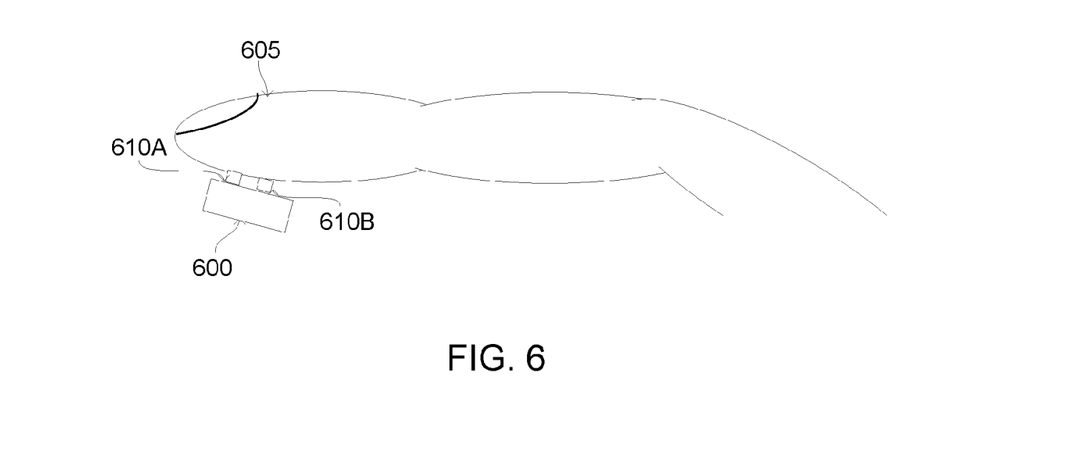
FIG. 6 is a conceptual diagram of one embodiment of an actuator including one or more pins positioned proximate to one or more bladders to provide tactile feedback to a user, in accordance with an embodiment.

FIG. 6 is a conceptual diagram of one embodiment of an actuator 600 including one or more pins 610 positioned proximate to one or more bladders to provide tactile feedback to a user. The embodiment shown in FIG. 6 may be an implementation of one or more of the actuators 205 described above in conjunction with FIG. 2. In other embodiments, the actuator may include different or additional components than those described in conjunction with FIG. 6.

As shown in FIG. 6, the actuator 600 is positioned so surfaces of one or more pins 610A, 610B contact a surface of a user's finger 605. For example, the actuator 600 is included in a glove or other VR input interface 140 that contacts at least a portion of the user's body. When the actuator 600 receives one or more instructions from the VR console 110 or from another component of the VR system environment 100, one or more bladders included in the actuator 600 inflate or deflate, causing positions of the pins 610A, 610B to move. As the pins 610A, 610B move, portions of the user's finger 605 contacting the pins 610A, 610B move, stretching a portion of the skin of the user's finger 605 and providing the user with tactile feedback, such as a perception of weight.

In another example, one or more pins contact portions of the user's body and contact an actuator, such as a piezoelectric motor or a voice coil linear motor, where a current is applied to the actuator where a current is applied to the actuator to produce a magnetic field that repositions the pin. For example, a pin contacts a portion of the user's body and is positioned proximate to a voice coil linear motor, with a current applied to the voice coil linear motor based on the received instructions. As another example, a pin contacts a portion of the user's body and also contacts a piezoelectric motor. Based on instructions from the VR console 110, the piezoelectric motor extends to reposition the pin and stretch the portion of the user's body contacting the pin.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A system comprising:
   a console coupled to an electronic display in a head mounted display, the console configured to provide content to the electronic display for presentation to a user; and
   a glove configured to be worn on a hand of the user and coupled to the console, the glove comprising:
      one or more actuators located at positions of the glove and configured to contact a portion of the hand of the user, each actuator further configured to receive instructions from the console and to stretch the portion of the hand of the user contacting the actuator based on the received instructions, an actuator comprising:
         a pin positioned proximate to a surface of a bladder, the pin configured to contact the portion of the body of the user; and
         the bladder, which is configured to inflate with a fluid and reposition the pin based on the received instructions.

2. The system of claim 1, wherein the actuator is configured to move in a direction parallel to the portion of the hand of the user contacting the actuator based on the received instructions.

3. The system of claim 2, wherein an additional actuator is configured to move in an additional direction parallel to the portion of the hand of the user contacting the additional actuator based on instructions received by the additional actuator, the additional direction differing from the direction.

4. The system of claim 2, wherein different actuators receive different instructions from the console causing a set of the actuators to move in a direction different than a direction in which another set of the actuators are caused to move.

5. The system of claim 2, wherein each actuator moves in a common direction based on the received instructions.

6. A system comprising:
   a console coupled to an electronic display in a head mounted display, the console configured to provide content to the electronic display for presentation to a user; and
   a control configured to contact one or more parts of a body of a user, the control coupled to the console and comprising:
      one or more actuators located at positions of the control and configured to contact a portion of the body of the user, each actuator further configured to receive instructions from the console and to stretch the portion of the body of the user contacting the actuator based on the received instructions, an actuator comprising:
         a pin positioned proximate to a surface of a bladder, the pin configured to contact the portion of the body of the user; and
         the bladder, which is configured to inflate with a fluid and reposition the pin based on the received instructions.

7. The system of claim 6, wherein the actuator is configured to move in a direction parallel to the portion of the body of the user contacting the actuator based on the received instructions.

8. The system of claim 7, wherein an additional actuator is configured to move in an additional direction parallel to the portion of the body of the user contacting the additional actuator based on instructions received by the additional actuator, the additional direction differing from the direction.

9. The system of claim 7, wherein different actuators receive different instructions from the console causing a set of the actuators to move in a direction different than a direction in which another set of the actuators are caused to move.

10. The system of claim 7, wherein each actuator moves in a common direction based on the received instructions.

* * * * *

UNITED STATES PATENT AND TRADEMARK OFFICE
CERTIFICATE OF CORRECTION

PATENT NO. : 10,025,386 B2
APPLICATION NO. : 15/344425
DATED : July 17, 2018
INVENTOR(S) : Sean Jason Keller et al.

It is certified that error appears in the above-identified patent and that said Letters Patent is hereby corrected as shown below:

In the Claims

Column 11, Line 59, Claim 1, delete "portion of the body" and insert --portion of the hand--.

Signed and Sealed this
Twelfth Day of March, 2019

Andrei Iancu
*Director of the United States Patent and Trademark Office*